United States Patent Office 3,270,066
Patented August 30, 1966

3,270,066
SUBSTITUTED POLYHALOCYCLOPENTADIENES AND PROCESSES FOR THEIR PRODUCTION
Hanswilli von Brachel, Cologne-Sulz, Germany, assignor to Farbenfabriken Bayer Aktiengesellschaft, Leverkusen, Germany, a corporation of Germany
No Drawing. Filed Sept. 20, 1960, Ser. No. 57,147
Claims priority, application Germany, Sept. 22, 1959, F 29,434; Sept. 30, 1959, F 29,495; Jan. 16, 1960, F 30,319
5 Claims. (Cl. 260—648)

The object of the present invention is a new and useful process for the production of substituted polyhalocyclopentadienes.

In accordance with the new process of the present invention, polyhalocyclopentadienes which may contain other substituent radicals are reacted with a neutral ester of an acid of phosphorus; the reaction mixture formed is then converted by solvolysis with water, alcohols, phenols, mercaptans, ammonia, primary or secondary amines into a mixture of substituted polyhalocyclopentadienes, on the one hand, and phosphoric acid diesters, phosphoric triesters, thiophosphoric acid triesters or phosphoric acid diester amides, on the other hand. The substituted polyhalocyclopentadienes thus formed are separated and recovered in accordance with known methods. By the term "solvolysis" as used herein is to be understood the decomposition of a substance in a solvent with the addition of the elements of the solvent, of which hydrolysis, namely, decomposition by water, is an example.

In this reaction alkyl, cycloalkyl or aryl radicals are introduced into the cyclopentadiene ring by replacement of halogen atoms of the polyhalocyclopentadiene. Thus, the reaction proceeds in accordance with the general reaction that is represented in the following equation:

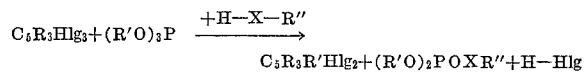

wherein:

Hlg represents a halogen radical,
R denotes hydrogen, halogen, alkyl, cycloalkyl, aryl or alkoxy radicals of this group, the organic radicals being, if desired, further substituted by inert hetero atoms or functional groups,
R' denotes alkyl, cycloalkyl or aryl radicals which may, if desired, also contain inert hetero atoms or functional groups,
R" denotes hydrogen, alkyl, cycloalkyl or aryl groups which may be further substituted by hetero atoms or functional groups if desired,
X is oxygen, sulfur, an imino or alkylimino group, and
C₅ stands for a carbocyclic five-membered ring which contains two double bonds.

In further elaborating the embodiments of the present invention, it has been found that, instead of neutral esters of phosphorous acid, neutral esters or neutral esters amides of phosphorous acid, phosphonous acids, phosphinous acids or the corresponding thio compounds may be used as reactants as described hereinafter.

It was thus recognized that the exchange of the halogen of polyhalocyclopentadienes for alkyl, cycloalkyl or aryl groups with the aid of neutral esters of phosphorous acid may be carried out with all compounds of trivalent phosphorus which undergo, like the neutral esters of phosphorous acid, the so-called Arbuzov reaction (G. M. Kosolapoff, "Organophosphorus Compounds," John Wiley & Sons, Inc., New York, 1950, page 121 ff.), and which thus contain at least one alkyl, cycloalkyl or aryl group bound to the trivalent phosphorus via oxygen or sulphur.

This reaction according to the broader invention may be represented by the following general equation:

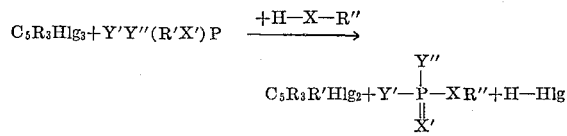

wherein

Hlg, R, R', R", X and C₅ have the aforesaid significance, while
Y' and Y" stand for alkyl, cycloalkyl or aryl groups or for —NH₂, —NR'₂ or R'X', and wherein
X' stands for oxygen or sulphur.

Compounds of trivalent phosphorus which may be used as starting material in the process described herein include triesters of phosphorous acid [P(OR')₃], triesters of monothio-, dithio- and trithiophosphorous acids [P(SR')(OR')₂, P(SR')₂(OR'), and P(SR')₃], diesters of alkyl-, cycloalkyl- and arylphosphonous acids [R'P(OR')₂] and monoesters of dialkyl-, dicycloalkyl-, diaryl-, alkylcycloalkyl-, alkylaryl- and cycloalkylarylphosphinous acids [R'₂POR'] as well as mono- and dithio compounds of these acids. Furthermore there may be mentioned the diester amides of phosphorous acid, monoester-diamines of phosphorous acid and the ester amides of the alkyl-, cycloalkyl- and aryl-phosphonous acids as well as the thio compounds corresponding to these esters. As special examples there may be mentioned the compounds described in the book by G. M. Kosolapoff, "Organophosphorus Compounds," referred to hereinbefore, pages 146–147, 171–173 and page 304.

Alcohols which can form the basis of the above-mentioned esters and with whose hydrocarbon radical the halogen atom of the polyhalocyclopentadienes is exchanged, include, for example, methanol, ethanol, isopropanol, n-butanol, isobutanol, decanol, octadecanol, cyclopentanol, cyclohexanol, cycloheptanol, 2-cyclohexyl-ethanol-(1), allyl alcohol, octadecenol, ethylene glycol, propanediol-(1,3), ethylene glycol monomethyl ether (methoxyethanol), diethylene glycol monoacetate, N-β-hydroxyethyl-acetamide, diethylene glycol monophenyl ether, lactic acid ethyl ester, N-methyl-N-β-hydroxyethyl-aniline, phenol, benzyl alcohol, phenyl-ethyl alcohol and naphthyl-ethyl alcohol.

Amines which may form the basis of the above described amide esters include primary amines such as methyl-, ethyl-, isopropyl-, iso-amyl-, cetyl-amine and aniline, and secondary amines such as dimethyl-, diethyl-, methyl-isopropyl-, dibutyl- and diisobutyl-amine, piperidine, N-methyl-aniline, N-methyl-toluidine, and N-ethyl-naphthyl-amine.

Polyhalocyclopentadienes which may be used as starting material for the process described herein include, by way of example, hexachlorocyclopentadiene,
hexabromocyclopentadiene,
tetrachlorodifluorocyclopentadiene,
pentachloromonofluorocyclopentadiene,
pentachlorocyclopentadiene,
tetrachlorocyclopentadiene,
methylpentachlorocyclopentadiene,
ethylpentachlorocyclopentadiene,
isooctylpentachlorocyclopentadiene,
phenylpentachlorocyclopentadiene,
diethyltetrachlorocyclopentadiene,
1,2,3-trichloroindene,
1,2,3-tribromoindene,
perchloroindene,
methoxy-pentachlorocyclopentadiene, chloroethylpentachlorocyclopentadiene,
trichloromethylpentachlorocyclopentadiene,
cyclohexylpentachlorocyclopentadiene.

The specified alkyl, cyclo-alkyl, and aryl-polyhalocyclopentadienes may be produced according to processes described herein.

Alcohols which may be used in the solvolysis reactions referred to herein include, for example, methanol, ethanol, isopropanol, n-butanol, octanol, octadecanol, allyl alcohol, crotyl alcohol, phenylethyl alcohol, ethylene glycol, ethylene glycol monomethyl ether, diethylene glycol monomethyl ether, cyclohexanol, tetrahydrofurfuryl alcohol, chloroethyl alcohol, α- and β-chlorohydrin, glycerol and trimethylolpropane. Mercaptans that may be used include, for example, methyl-, ethyl-, isopropyl, dodecyl-, benzyl- and phenyl-mercaptan. Phenols which may be used include, for example, phenol, cresol, nitrophenol, pentachlorophenol, hydroquinone, hydroquinone monomethyl ether, salicyclic acid, methyl ester (methyl salicylate), α-naphthol and o-hydroxy-diphenyl. Amines which may be used include methyl amine, dimethyl amine, N-butyl amine, isobutyl amine, piperidine, morpholine, aniline, N-methyl aniline, benzyl amine and naphthyl amine.

For carrying out the reaction the ester of the acid of phosphorus is generally added dropwise to the polyhalocyclopentadiene, which may be diluted with an inert solvent such as ether, dioxane, N,N-dimethylformamide, benzene, xylene, and chlorobenzene, at a temperature between −100° C. and 150° C. An amount between one and three mols of the ester of the acid of phosphorus, which may be dissolved in the same inert solvent, is added for each mol of the polyhalocyclopentadiene. In some cases, however, the polyhalocyclopentadiene can be added to the ester of the acid of phosphorus. An excess of the polyhalocyclopentadiene may also be used. To avoid side reactions, cooling of the reaction mixture is recommended, since most of these reactions are exothermic. However, when using the less reactive cycloalkyl or aryl esters or the less active polyhalocyclopentadienes which contain less halogen, heating will be necessary and possibly further heating at a temperature between 50 and 180° C. for a prolonged period of time may be required. The course of the reaction may be determined either by the subsiding heat effect, or by hydrolysis of a sample of the reaction mixture with water with the addition of pyridine and subsequent titration of the acid (H–Hlg) formed according to the above equation. When the first reaction step is terminated, the reaction is completed by stirring the reaction mixture with one of the solvents that were referred to hereinbefore as solvolysis agents at a temperature between −30° C. and 150° C. When alcohols, phenols or mercaptans are used, it is advisable to add a hydrogen-halide acceptor such as a tertiary base or, if necessary, alkali-metal or alkaline-earth-metal-alcoholates, mercaptides or phenolates in order to avoid side reactions and to accelerate the reaction. In solvolysis reactions with amomnia, primary or secondary amines, these bases themselves are hydrogen-halide acceptors. Because of the lability of most polyhalocyclopentadienes in the presence of basic substances, an excess should as far as possible be avoided in the use of alkali-metal or alkaline-earth-metal-hydroxides or organic bases. The reaction should also be carried out at the lowest possible temperature. Also in this case the end of the reaction can be determined by titration or by working up a sample.

The procedures to be used for the recovery and separation of the reaction products is generally determined by the type of the phosphorus compounds formed. Thus, e.g., the phosphoric or the thiophosphoric acid diesters, phosphoric acid ester amides and acid phosphonic acid esters or amides formed in the hydrolysis with water may be extracted either with water or with weak alkalies. The neutral esters or ester amides formed in solvolysis reactions with alcohols and phenols may, on the other hand, be readily separated by fractional distillation, while in other cases precipitation or crystallization from certain solvents may be found to be suitable. In some cases, however, separation of the products from the reaction mixture may be unnecessary, e.g., if mixtures of polyhalocyclopentadienes and tertiary thiophophates are to be used as lubricant additives. The polyhalocyclopentadienes can also be separated in the form of a derivative produced by chemical conversion if desired.

Further it has surprisingly been found that substituted cyclopentadienes are also obtained by reacting polyhalocyclopentenes having at least three halogen atoms and which may be substituted, with the aforementioned phosphorus compounds.

In the case where octachloro cyclopentene and tri-n-butyl phosphite are used as starting materials the reaction proceeds according to the following equation:

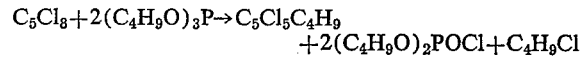

$$+2(C_4H_9O)_2POCl+C_4H_9Cl$$

In general terms the reaction may be illustrated by the following scheme:

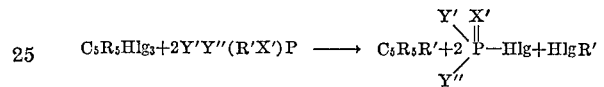

The symbols have the same significance as given at the beginning of the specification, except $C_5R_5Hlg_3$ and $C_5R_5R'$ are carbocyclic five-membered rings with respectively only one double bond and with two double bonds.

Polyhalocyclopentenes which may be used for the process of the present invention can also contain beside the halogen atoms other substituents such as alkyl, cycloalkyl, arylalkoxy groups. The polyhalocyclopentenes can also be the nucleus of a polycyclic compound such as is the case with perchloroindene. Furthermore functional derivatives of polyhalocyclopentenes such as polyhalocyclopentenone may be used.

The following individual polyhalocyclopentenes are especially suitable for the process according to the invention:

octachlorocyclopentene,
hexachlorodifluorocyclopentene,
hexachlorodibromocyclopentene,
hexachlorodiodocyclopentene,
heptachlorocyclopentene,
hexachlorocyclopentene,
methylheptachlorocyclopentene,
n-butyl-heptachlorocyclopentene,
chloroethylheptachlorocyclopentene,
cyclohexylheptachlorocyclopentene and
cyclohexylhexachlorocyclopentene.

Esters of phosphorous acids which may be used are those specified hereinbefore. Especially good results are obtained with the following neutral phosphites: trimethyl, triethyl, tri-isopropyl, tri-n-butyl, trioctadecyl, trichloroethyl, tricyclohexyl, phenyl-dimethyl, and trifurfuryl phosphites and the phosphites of ethyl lactate, N-β-hydroxyethyl acetamide, 2-hydroxyethyl cresyl ether, 2-hydroxyethyl naphthyl ether, ethylene glycol monomethyl ether and ethylene glycol monoacetate.

For carrying out this reaction, ester of phosphorus acid is, in general, added dropwise at temperatures between −30° C. and +150° C. to the polyhalocyclopentene which may be dissolved in an inert solvent. In some cases it may, however, be advantageous for the polyhalocyclopentene to be added dropwise to the phosphite.

Inert solvents which may be used in this reaction include e.g., benzene, aliphatic hydrocarbons, esters, ethers such as dioxane, tetrahydrofuran, and aliphatic ethers, furthermore formamides such as N,N-dimethylformamide.

For each mol of polyhalocyclopentene 0.5 to 10 mols and preferably 2 mols of the neutral phosphite can be used.

In most cases the reaction is strongly exothermic and is completed in a short time. With polyhalocyclopentenes having a lower halogen content or slowly-reacting phosphites, heating must be continued for some time to complete the reaction. The course of the reaction may be readily followed by observation of the ultraviolet or infrared spectra of withdrawn samples.

The working up of the reaction mixture is carried out either by distillation, crystallization, extraction and chromatography or by chemical conversion of the individual reaction products.

Reaction of the phosphoric halides that are formed together with the substituted polyhalocyclopentenes with a solvolysis solvent is the most convenient way for recovery of the products. Water, alcohols, ammonia, amines, mercaptans, phenols, and thiophenols may be used and the separation of the stable phosphoric acid ester derivatives thus obtained may be performed as described hereinbefore. When phenols and mercaptans, the addition of hydrogen-halide acceptors such as tertiary bases, alkali-metal and alkaline-earth-metal alcoholates, mercaptides or phenolates has been recommended for the avoidance of side reactions and acceleration of the reaction itself. In solvolysis reactions with ammonia, primary or secondary amines, these bases themselves are hydrogen-halide acceptors. Because of the lability of most polyhalocyclopentadienes in the presence of basic substances, an excess of alkali-metal or alkaline-earth-metal hydroxides or organic bases, when used, should also here be avoided as far as possible and the reaction should be carried out at a low temperature. The end of the reaction can in each case be determined by titration or working up of a sample.

A preferred embodiment of the method of recovering the products here consists also in the saponification of the phosphoric halide thereby producing phosphoric esters whose alkali-metal salts are generally soluble and can be readily washed out with water.

The process of the present invention has made readily available a number of compounds that were hitherto unknown or obtainable only with difficulty. The substituted polyhalocyclopentadienes are technically valuable intermediate products for the production of plant-protection agents and synthetic materials. Phosphoric acid and phosphonic acid derivatives obtained in accordance with the process of this invention also possess technical interest, e.g., as plant-protection agents, plasticizers and surface-active substances and the like.

The following examples are given for the purpose of illustrating the invention.

*Example 1*

To 273 parts by weight of hexachlorocyclopentadiene (1 mol) is added dropwise while the temperature is maintained at 10–20° C. with the aid of an ice bath within one hour, 166 parts by weight of triethyl phosphite (1 mol) followed by stirring for 2 hours. In this case, as well as in the following examples, the end of the reaction is determined by shaking a 1-ml. sample of the mixture with 50 ml. of water and 10 ml. of pyridine for a period of 10 minutes, followed by titration with an N/10 solution of sodium hydroxide. The whole reaction mixture is then heated at its boiling point with 2500 parts by volume of water for 2 hours. The ethylpentachlorocyclopentadiene that is thus formed precipitates as a heavy oil while the diethyl phosphate remains in solution. For purification the ethylpentachlorocyclopentadiene is washed several times with water and distilled in vacuo. The diethyl phosphate can be recovered from the aqueous solution by evaporation in vacuo.

The boiling point of the ethylpentachlorocyclopentadiene thus obtained is 107–110° C./12–14 mm. Hg. Its yield, refractive index, and analysis follow. $n_D^{20}$ 1.5422. Yield 240 parts by weight corresponding to 93% of the theoretical.

*Analysis.*—Calculated: C, 31.5%; H, 1.9%; Cl, 67.0%. Found: C, 30.6%; H, 1.8%; Cl 67.4%.

The boiling point of the diethyl phosphate thus obtained is 116–118° C. /0.01 mm. Hg, and its yield and other characteristics follow. $n_D^{20}$ 1.4160, lead salt melting point 180° C.

Crude yield 130 parts by weight corresponding to 65% of the theoretical.

*Example 2*

To 273 parts by weight of hexachlorocyclopentadiene (1 mol) there are added dropwise at 30–40° C. within 1 hour 208 parts by weight of triisopropyl phosphite, the reaction mixture is further stirred at 40° C. for 1 hour and allowed to stand over night. 2000 parts by volume of an N/1 solution of sodium hydroxide are used for hydrolysis at 30° C., the insoluble isopropylpentachlorocyclopentadiene is separated, washed with water, dried and distilled. In the distillation there are obtained 220 parts by weight (78% of the theoretical) of isopropylpentachlorocyclopentadiene of boiling point 123–126° C./12–14 mm. Hg and $n_D^{20}$ 1.5400.

*Analysis.*—Calculated: C, 34.2%; H, 2.5%; Cl, 63.3%. Found: C, 33.8%; H, 2.6%; Cl, 64.0%.

*Example 3*

To 208 parts by weight of tri-n-propyl phosphite (1 mol) there are added dropwise with vigorous stirring and cooling to −5° C. to 0° C. with ice-salt in the course of 1.5 hours, 273 parts by weight of hexachlorocyclopentadiene (1 mol). This is heated to 40–50° C. for 1 hour and hydrolyzed with 3000 parts by volume of water by boiling for 2 hours. n-Propyl-pentachlorocyclopentadiene separates together with the bulk of the phosphoric acid di-n-propyl ester. The latter is taken up with a sodium hydrogen carbonate solution and can be separated from this solution with hydrochloric acid after separation of the cyclopentadiene. The oil, insoluble in bicarbonate solution, is washed with water, dried and distilled. By distillation there are obtained 230 parts by weight of n-propyl-pentachlorocyclopentadiene corresponding to a yield of 82% of the theoretical, boiling point: 126° C./12 mm. Hg and $n_D^{20}$ 1.5340.

*Analysis.*—Calculated: C, 34.2%; H, 2.5%; Cl, 63.3%. Found: C, 35.2%; H, 2.8%; Cl, 61.7%.

*Example 4*

To 273 parts by weight of hexachlorocyclopentadiene (1 mol) there are added dropwise with ice cooling at 0° C. within one hour, 250 parts by weight of tri-n-butyl phosphite, the mixture is allowed to stand for 1 hour at room temperature and the reaction product treated with cooling and vigorous stirring with an N/2 solution of sodium hydroxide until a pH value of 9 is maintained for a prolonged time. 4000 parts by volume are required for this purpose. The organic phase is then separated and further shaken twice with carbon tetrachloride, and the organic phase, united with the chloroform extract, is washed with water and dried over sodium sulphate. By fractional distillation there are obtained 220 parts by weight (75% of the theoretical) of n-butyl-pentachlorocyclopentadiene of boiling point 134–136° C./12–14 mm. Hg and of $n_D^{20}$ 1.5258.

*Analysis.*—Calculated: C, 36.6%; H, 3.1%; Cl, 60.2%. Found: C, 37.2%; H, 3.3%; Cl, 58.6%.

From the aqueous solution 170 parts by weight of di-n-butyl phosphate are obtained by acidification with concentrated hydrochloric acid.

*Example 5*

27.3 parts by weight hexachlorocyclopentadiene (0.1 mol) are treated at 80° C. with 32.8 parts by weight of tricyclohexyl phosphite and maintained at this temperature for 8 hours. The mixture is then heated at its boiling point for 6 hours with 300 parts by volume of water with addition of 16 parts by weight of sodium hydrogen carbonate and the oil, remaining after separation of the aqueous solution, is washed several times with water, dried and distilled. By distillation about 10 parts by weight of cyclohexylpentachlorocyclopentadiene are obtained of boiling point 100–110° C./0.01 mm. Hg, $n_D^{20}$ 1.5576.

*Analysis.*—Calculated: C, 41.3%; H, 3.4%; Cl, 55.4%. Found: C, 41.9%; H, 3.5%; Cl, 54.2%.

Example 6

27.3 parts by weight of hexachlorocyclopentadiene (0.1 mol) are treated at 30° C. in the course of 1.5 hours with 38.2 parts by weight of lactic acid ethyl ester triphosphite and heated to 40° C. for 5 hours. The mixture is then saponified by heating to 100° C. for 2 hours with 500 parts by volume of water, the phosphoric acid ester and the free lactic acid formed are separated with sodium bicarbonate and the organic phase taken up in carbon tetrachloride, then washed with water and dried. By fractional distillation there are obtained about 10 parts by weight of 2-pentachlorocyclopentadienyl-propionic acid-ethyl ester of boiling point 155–160° C./12 mm. Hg and $n_D^{20}$ 1.5271.

*Analysis.*—Calculated: C, 35.5%; H, 2.7%; Cl, 52.5%; O, 9.5%. Found: C, 35.2%; H, 2.6%; Cl, 53.3%; O, 8.3%.

Example 7

To 273 parts by weight of hexachlorocyclopentadiene (1 mol) there are added dropwise at 0–10° C. within 2 hours 256 parts by weight of tris(2-methoxyethyl) phosphite. After one hour's heating to 50° C. the mixture is hydrolyzed by 3 hours stirring with 2500 parts by volume of water, the organic phase separated and washed with water. By distillation there are obtained 150 parts by weight of 2-oxa-butyl-(4)-pentachlorocyclopentadiene of boiling point 136° C./14 mm. Hg, $n_D^{20}$ 1.5335.

*Analysis.*—Calculated: C, 32.4%; H, 2.4%; Cl, 59.8%; O, 5.5%. Found: C, 32.4%; H, 2.5%; Cl, 60.5%; O, 5.5%.

Example 8

To 23.8 parts by weight of pentachlorocyclopentadiene (0.1 mol) there are added dropwise in the course of 2 hours at 40° C., 25.0 parts by weight of tri-n-butyl phosphite (0.1 mol) and the mixture is further heated to 50° C. for 5 hours. It is then hydrolyzed by stirring with 400 parts by volume of an N/2 solution of sodium hydroxide and the separated n-butyl-tetrachlorocyclopentadiene is washed, dried and distilled. By distillation there are obtained 15–18 parts by weight of n-butyl-tetrachlorocyclopentadiene of boiling point 133–136° C./14–16 mm. Hg and of $n_D^{20}$ 1.5278.

*Analysis.*—Calculated: C, 41.6%; H, 3.9%; Cl, 54.6%. Found: C, 41.0%; H, 3.8%; Cl, 55.1%.

Example 9

20.4 parts by weight of tetrachlorocyclopentadiene (0.1 mol) are dissolved in 50 parts by volume of benzene with 25.0 parts by weight of tri-n-butyl phosphite heated to 80° C. for 10 hours, the benzene is then distilled off in vacuo and the residue hydrolyzed by 24 hours stirring with 200 parts by volume of water. The water is then separated and the phosphoric acid dibutyl ester taken up in a sodium bicarbonate solution. The alkali-insoluble oil is washed with water and distilled. By distillation there are obtained 15 parts by weight of n-butyl-trichlorocyclopentadiene of boiling point 107–110° C./12–14 mm. Hg and $n_D^{20}$ 1.5080, as well as a small quantity of tetrachlorocyclopentadiene and di-n-butyl-trichlorocyclopentadiene.

Analysis of the n-butyl-trichlorocyclopentadiene— Calculated: C, 48.0%; H, 4.9%; Cl, 47.1%. Found: C, 47.9%; H, 5.0%; Cl, 47.0%.

Example 10

26.7 parts by weight of the ethyl-pentachlorocyclopentadiene (0.1 mol) produced as described in Example 1 are heated to 70° C., at this temperature there are added dropwise within ½ hour 16.6 parts by weight of triethyl- phosphite. Heating is then continued for 6–8 hours to 100–120° C. followed by hydrolysis with 250 parts by volume of water by 2 hours heating to the boil. The expected cyclopentadiene remains as an oil undissolved. After washing and drying, distillation gives 18 parts by weight of diethyltetrachloropentadiene of boiling point 108–112° C./14 mm. Hg and of $n_D^{20}$ 1.5254.

*Analysis.*—Calculated: C, 41.5%; H, 3.8%; Cl, 54.6%. Found: C, 40.9%; H, 3.8%; Cl, 54.9%.

Example 11

273 parts by weight of hexachlorocyclopentadiene (1 mol) are reacted, as described in Example 4, with 250 parts by weight of tri-n-butyl phosphite. 81 parts by weight of n-butanol (1.1 mols) and 121 parts by weight of 4,4-dimethylaniline (1 mol) are then added to the reaction mixture with vigorous stirring in the course of 1 hour. The reaction mixture is allowed to stand overnight and then washed successively several times with dilute hydrochloric acid, water, sodium bicarbonate solution and again with water. By fractional distillation there are obtained after drying about 220 parts by weight of n-butyl-pentachlorocyclopentadiene of boiling point 134–136° C./12–14 mm. Hg and of $n_D^{20}$ 1.5265, and about 150 parts by weight tri-n-butyl phosphate of boiling point 160–165° C./12–14 mm. Hg and of $n_D^{20}$ 1.4250.

Example 12

273 parts by weight of hexachlorocyclopentadiene (1 mol) and 166 parts by weight of triethyl phosphite are reacted with one another as in Example 1. A mixture of 94 parts by weight of phenol and 121 parts by weight of dimethylaniline is then added dropwise to this reaction mixture in the course of 2 hours, allowed to stand overnight, washed successively with dilute hydrochloric acid, dilute caustic soda and water, and fractionated. In this way there are obtained about 220 parts by weight of ethylpentachlorocyclopentadiene of boiling point 107–110° C./13–14 mm. Hg and of $n_D^{20}$ 1.5428, as well as about 180 parts by weight of phosphoric acid diethylphenyl ester of boiling point 146–160° C./144 mm. Hg.

Example 13

273 parts by weight of hexachlorocyclopentadiene (1 mol) and 166 parts by weight of triethyl phosphite (1 mol) are reacted with one another as described in Example 1. 173 parts by weight of morpholine are then added dropwise in the course of 3 hours to the reaction mixture which is allowed to stand overnight. It is then washed successively with dilute hydrochloric acid, water, with sodium hydrogen carbonate solution and again with water. After drying, there may be isolated by fractional distilaltion about 200 parts by weight of the above described ethylpentachlorocyclopentadiene of boiling point 107–110° C./12–14 mm. Hg and of $n_D^{20}$ 1.5422, as well as about 120 parts by weight of phosphoric acid-diethylester-morpholide (boiling point 138–140° C./12–14 mm. Hg).

Example 14

To 273 parts by weight of hexachlorocyclopentadiene (1 mol) there are added dropwise in the course of 2 hours at 80° C., 332 parts by weight of triethyl phosphite (2 mols) and heated to 100–120° C. for 6–8 hours. 4000 parts by volume of water are then used for hydrolysis by heating the mixture at its boiling point for 2 hours, the aqueous phase is separated and the organic phase washed with water. By distillation there is obtained about 180–200 parts by weight of diethyltetrachlorocyclopentadiene of boiling point 108–112° C./14 mm. Hg and $n_D^{20}$ 1.5250.

Example 15

To a solution of 273 parts by weight of hexachlorocyclopentadiene (1 mol) in 500 parts by volume of ether there are added dropwise at −20° C. within 1 hour with vigorous stirring, a solution of 254 parts by weight of phenyl-phosphinic acid dibutyl ester in 200 parts by volume of ether. The ether is then distilled off on the water bath and the residue heated at its boiling point for 2 hours with 2000 parts by volume of water. The mixture is then neutralized with sodium bicarbonate whereby the n-butyl-pentachlorocyclopentadiene remains as a brown oil. It is washed with water, dried over calcium chloride and fractionally distilled in vacuum. Apart from a small quantity of a higher alkylation product the yield is about 230–250 parts by weight of n-butyl-pentachlorocyclopentadiene of boiling point 134–136°/12–14 mm., $n_D^{20}$ 1.5258. Its infra-red spectrum is identical with that of the product obtained from tributyl phosphite according to Example 4.

From the aqueous solution the phenyl phosphonic acid-monobutyl ester is obtained by acidification.

*Example 16*

In analogy to Example 15 a number of phenyl-phosphinic acid dialkyl esters (represented by the formula $(C_6H_5)P(OC_2H_5)_2$) are reacted with hexachlorocyclopentadiene and the resulting substituted pentachlorocyclopentadienes are given in the following table:

| Phenyl-phosphinic acid ester | Alkyl-pentachloro-cyclopentadiene | B.p./mm. | $n_D^{20}$ | Yield, percent |
|---|---|---|---|---|
| Diethylester | Ethyl | 107–110°/12–14 | 1.5420 | 90 |
| Diisopropyl ester | Isopropyl | 123–126°/12–14 | 1.5400 | 75 |
| Di-n-propyl ester | n-Propyl | 126°/12 | 1.5330 | 83 |
| Di-(3-oxabutyl)-ester [1] | 3-oxabutyl | 136°/14 | 1.5340 | 68 |
| Dicyclohexyl-ester | Cyclohexyl | 110°/0.01 | 1.5560 | 60 |

[1] Further heated at +50° C. for 4 hours.

All the products correspond in their physical properties and in their infra-red spectrum with those obtained according to those of the foregoing examples.

*Example 17*

In analogy to Example 15 a number of phosphorous acid dialkyl ester dialkyl amides (i.e., dialkyl esters of N,N-dialkylamidophosphorous acids represented by the formula $P(NR_2)(OR)_2$) are reacted with hexachlorocyclopentadiene and the resulting alkyl-pentachlorocyclopentadienes are indicated in the following table:

| Phosphorous acid di-alkylester-N,N-di-alkylamide | Alkylpentachloro-cyclopentadiene | Yield, percent |
|---|---|---|
| Diethylester-N,N-di-ethyl-amide | Ethyl-pentachloro-cyclopentadiene | 84 |
| Dibutylester-N,N-di-methyl-amide | n-Butyl-pentachloro-cyclopentadiene | 79 |
| Dicyclohexylester-N,N-di-methylamide.[1] | n-Cyclohexyl-pentachloro-cyclopentadiene | 61 |

[1] Further heated at +50° C. for 4 hours.

The properties of these alkyl-cyclopentadienes correspond to the properties of those obtained according to Examples 15 and 16 as well as to the foregoing examples.

*Example 18*

To 267 parts by weight of the ethyl-pentachlorocyclopentadiene (1 mol) produced according to Example 16 or 17 there are added dropwise in the course of 1 hour at 60° C., 165 parts by weight of phosphorous acid diethyl ester-N,N-dimethyl amide ($P(OC_2H_5)_2$-$N(CH_3)_2$) and the mixture is subsequently heated to 80° C. for a further period of 4–8 hours. It is then heated at its boiling point for 2 hours with 3000 parts by volume of water and the phosphoric acid monoethyl ester-N,N-dimethylamide taken up in a solution of sodium bicarbonate. The remaining undissolved diethyl-tetrachloro-cyclopentadiene is then separated, washed with water, dried and distilled. Boiling point 108–112°/14 mm., $n_D^{20}$ 1.5250, corresponding with the product described in Example 10.

*Example 19*

Phenyl-phosphinic acid diethyl ester or -dibutyl ester was reacted with hexachloro-cyclopentadiene as described in Example 15 with the difference that instead of effecting the solvolysis with water, it was effected with ethanol or butanol. After the addition of the phenyl-phosphinic acid ester the ether solution was stirred for an hour at 0° C. and then treated with 5 mols of alcohol and finally with 1 mol of N,N-diethyl-aniline as acid acceptor and stirred at 0° C. for 3 hours and for 12 hours at 25° C. The organic phase was then washed with strongly diluted hydrochloric acid and washed with water, then dried with calcium chloride and fractionally distilled in vacuum. Yield about 80% or 75% of the theoretical of ethyl- or n-butyl - pentachlorocyclopentadiene respectively together with 82% of phenyl-phosphonic acid diethyl ester of boiling point 121–125°/2 mm. and 73% of phenyl-phosphonic acid dibutyl ester of boiling point 166°/4 mm.

*Example 20*

To a solution of 344 g. (1 mol) of octachlorocyclopentene dissolved in 500 ml. of benzene there are added dropwise within 2 hours 500 g. (2 mol) of tri-n-butylphosphite; by cooling the temperature of the reaction mixture is held to 40–50° C. After the end of the addition the benzene is distilled off together with the butyl chloride on a water bath and the phosphoric acid dibutyl ester monochloride contained in the residue is hydrolyzed by boiling for 2 hours with 5000 ml. of water. After the end of the hydrolysis the organic phase is separated and the phosphoric acid dibutyl ester is shaken with sodium hydrogen carbonate solution whereby about 270–280 g. of n-butyl-pentachlorocyclopentadiene remain which is purified by distillation. Boiling point 136°/12 mm. Hg; $n_D^{20}$ 1.5265.

Calculated: C, 36.6%; H, 3.1%; Cl, 60.2%. Found: C, 36.8%; H, 3.3%; Cl, 59.9%.

*Example 21*

To 344 g. (1 mol) of octachlorocyclopentene dissolved in 500 ml. of benzene there are added dropwise with cooling at 40–50° C. 332 g. (2 mol) of triethyl phosphite. The ethyl chloride (about 60 g.) and the benzene are then distilled off through a good effective column. The residue is worked up as in Example 20. Yield about 250 g. of ethyl pentachlorocyclopentadiene, boiling point 107–110° C./12–14 mm. Hg, $n_D^{20}$ 1.5422.

*Example 22*

To 344 g. (1 mol) of octachlorocyclopentene there are added dropwise at 45° C. within 2 hours 416 g. (2 mols) of tri-isopropyl phosphite and the temperature of the reaction mixture is maintained by cooling at 45° C. According to the working up described in Example 20 240–260 g. of isopropylpentachlorocyclopentadiene are obtained. Boiling point 126° C./14 mm. Hg, $n_D^{20}$ 1.5400.

*Example 23*

34.4 g. (0.1 mol) of octachlorocyclopentene are heated with 69 g. (0.21 mol) of tricyclohexyl phosphite to 80° C. for 8 hours. Working up follows according to Example 20. Yield: 15–20 g. of cyclohexyl pentachloro cyclopentadiene. Boiling point 100–110° C./0.01 mm. Hg.

*Example 24*

To 34.4 g. (0.1 mol) of octachlorocyclopentene dissolved in 50 ml. of dry ether there are added dropwise at 35° C. within 3 hours 52 g. of 2-octabutyl-(4)-triphosphite. This is maintained at 35° C. for 4 hours and after evaporation of the ether, worked up as described above. Yield 25 g. of (2-oxabutyl-(4)-pentachlorocylopentadiene). Boiling point 136° C./14 mm. Hg, $n_D^{20}$ 1.5330.

I claim:
1. A process for the production of a lower-alkyl-substituted pentachlorocyclopentadiene together with a dialkyl phosphate which comprises reacting together hexachlorocyclopentadiene and a tris (low alkyl) phosphite in approximately equimolecular proportions and subsequently hydrolyzing the resulting reaction mixture by heating the same with an excess of water at a temperature not in excess of 150° C. for such a period as to convert the dialkyl phosphoryl chloride in the reaction mixture into a dialkyl phosphate; separating the organic phase and recovering both the dialkyl phosphate and the lower-alkyl-substituted pentachlorocyclopentadiene.

2. A process for the production of an alkyl-substituted polychlorocyclopentadiene which comprises
   (a) reacting together at a temperature between −100 and +150° C. a mixture of
      (i) an unsaturated polychlorocyclopentane derivative containing at least three chlorine substituents selected from the group consisting of polychlorocyclopentadienes and polychlorocyclopentenes and alkyl-substituted, cycloalkyl-substituted, aryl-substituted, and alkoxy-substituted polychlorocyclopentadienes and polychlorocyclopentenes; and
      (ii) a derivative of an acid of trivalent phosphorus selected from the group consisting of trialkyl phosphite, tricycloalkyl phosphite, tris(alkoxyalkyl) phosphite, dialkyl ester of phenyl phosphinic acid, dicyclo-alkyl ester of phenyl-phosphinic acid, dialkyl ester of an N,N-dialkylaminophosphorous acid, and dicyclohexyl ester of N,N-dialkylaminophosphorous acid, obtaining as one of the principal reaction products a phosphorus-free alkyl-substituted polychlorocyclopentadiene containing at least one more alkyl substituent and at least one less chlorine substituent than the starting unsaturated polychlorocyclopentane derivative together with an acid chloride of a phosphoric acid ester,
   (b) subjecting the resulting reaction mixture containing the desired alkyl-substituted polychlorocyclopentadiene together with the acid chloride of the phosphoric acid ester to a solvolysis reaction with a member selected from the group consisting of water, alcohols, phenols, mercaptans, ammonia, and primary and secondary amines, effecting said reaction at about −30° to +150° C., and converting the acid chloride of the phosphoric acid ester to hydrogen chloride and a halogen-free phosphoric acid ester;
   (c) separating the organic phase; and
   (d) recovering the alkyl-substituted polychlorocyclopentadiene product.

3. A process for the production of ethylpentachlorocyclopentadiene which comprises
   (a) reacting together at a temperature between about 10 and about 20° C. approximately equimolar proportions of hexachlorocyclopentadiene and triethyl phosphite,
   (b) heating the reaction mixture with water at a temperature of approximately 100° C.;
   (c) separating the organic phase; and
   (d) recovering diethyl phosphate and ethylpentachlorocyclopentadiene.

4. A process for the production of ethylpentachlorocyclopentadiene which comprises
   (a) adding triethyl phosphite to a solution of octachlorocyclopentene in benzene maintained at a temperature between about 40 and about 50° C. in an amount equivalent to about 2 mols of triethyl phosphite per mol of octachlorocyclopentene,
   (b) expelling the benzene and ethyl chloride from the resulting reaction mixture,
   (c) heating the residue with water, and
   (d) subsequently recovering the triethyl phosphate and ethylpentachlorocyclopentadiene.

5. A process for the production of an alkyl-substituted polyhalocyclopentadiene which comprises
   (a) reacting together at a temperature between −100 and +150° C. a mixture of
      (i) a polychlorocyclopentene containing at least three chlorine substituents, and
      (ii) a derivative of an acid of trivalent phosphorus of the group consisting of trialkyl phosphites, tricycloalkyl phosphites, tris(alkoxyalkyl) phosphites, dialkyl and dicycloalkyl esters of phenylphosphinic acid, and dialkyl and dicyclohexyl esters of N,N-dialkylamidophosphorous acids.

References Cited by the Examiner
UNITED STATES PATENTS

| | | | |
|---|---|---|---|
| 2,622,096 | 12/1952 | Ladd | 260—461.310 |
| 2,806,049 | 9/1957 | Raab et al. | 260—461.310 |
| 2,914,439 | 11/1959 | Richter | 260—461.310 |
| 3,037,044 | 5/1962 | Bruson et al. | 260—461.303 |

FOREIGN PATENTS 557,104    5/1958    Canada.
(Equivalent U.S. patent of Raab et al., 2,806,049, Sept. 10, 1957)

LEON ZITVER, *Primary Examiner.*
ABRAHAM RIMENS, ALPHONSO D. SULLIVAN,
*Examiners.*
J. W. WILLIAMS, S. H. BLECH, K. H. JOHNSON, K. V. ROCKEY, *Assistant Examiners.*

Notice of Adverse Decision in Interference

In Interference No. 95,796 involving Patent No. 3,270,066, H. von Brachel, SUBSTITUTED POLYHALOCYCLOPENTADIENES AND PROCESSES FOR THEIR PRODUCTION, final judgment adverse to the patentee was rendered Mar. 10, 1969, as to claim 2.

[*Official Gazette May 6, 1969.*]